United States Patent
Bian et al.

(10) Patent No.: US 8,437,907 B2
(45) Date of Patent: May 7, 2013

(54) METHOD FOR DETERMINING A ROADWAY STATE

(75) Inventors: Ning Bian, Esehborn (DE); Celine Gamulescu, Regensburg (DE); Andreas Mayer, Freiburg (DE); Thomas Schweiger, Wörth (DE)

(73) Assignee: Continental Automotive GmbH, Hannover (DE)

( * ) Notice: Subject to any disclaimer, the term of this patent is extended or adjusted under 35 U.S.C. 154(b) by 744 days.

(21) Appl. No.: 12/517,688

(22) PCT Filed: Oct. 31, 2007

(86) PCT No.: PCT/EP2007/061778
§ 371 (c)(1),
(2), (4) Date: Feb. 24, 2010

(87) PCT Pub. No.: WO2008/068119
PCT Pub. Date: Jun. 12, 2008

(65) Prior Publication Data
US 2010/0145567 A1 Jun. 10, 2010

(30) Foreign Application Priority Data
Dec. 5, 2006 (DE) .................. 10 2006 057 342

(51) Int. Cl.
| | |
|---|---|
| G01M 17/00 | (2006.01) |
| B60G 17/018 | (2006.01) |
| A01B 69/00 | (2006.01) |
| G06F 7/70 | (2006.01) |
| G06F 19/00 | (2006.01) |
| B60T 7/12 | (2006.01) |
| B60T 7/16 | (2006.01) |
| B62D 1/24 | (2006.01) |
| B60K 28/16 | (2006.01) |

(52) U.S. Cl.
USPC ....... 701/29.1; 701/30.4; 701/31.4; 701/32.1; 701/33.7; 701/33.8; 701/33.9; 701/37; 701/38; 701/41; 701/42; 701/65; 701/70; 701/71; 701/72; 701/73; 701/74; 701/80; 701/90; 701/91; 701/117; 180/167; 180/168; 180/169; 180/197

(58) Field of Classification Search .................. 701/29.1, 701/30.4, 31.4, 32.1, 33.7–33.9, 37, 38, 41, 701/42, 65, 70–74, 80, 90, 91, 117; 303/122.01, 303/138–156; 180/167–169, 197; 73/146; 340/905
See application file for complete search history.

(56) References Cited

U.S. PATENT DOCUMENTS

| | | | |
|---|---|---|---|
| 5,065,618 A | 11/1991 | Hodges, Sr. et al. | |
| 5,532,678 A | * 7/1996 | Kin et al. ............... | 340/438 |

(Continued)

FOREIGN PATENT DOCUMENTS

| | | |
|---|---|---|
| DE | 196 26 398 A1 | 9/1997 |
| DE | 10 2004 016 288 B3 | 8/2005 |

(Continued)

OTHER PUBLICATIONS

International PCT Search Report, PCT/EP2007/061778, 11 pages, Mailed Jan. 31, 2008.

(Continued)

*Primary Examiner* — James Trammell
*Assistant Examiner* — Majdi Alsomiri
(74) *Attorney, Agent, or Firm* — King & Spalding L.L.P.

(57) ABSTRACT

In a method for determining a roadway state (STATE) of a roadway on which a vehicle (10) is travelling which has at least one wheel (14) and an acceleration sensor (24) which is assigned to the wheel (14), in order to determine a vertical component of an acceleration of the wheel (14), a characteristic value which is representative of the roadway state (STATE) is determined as a function of a measured signal (AC_VERT) of the acceleration sensor (18).

12 Claims, 2 Drawing Sheets

U.S. PATENT DOCUMENTS

| | | | |
|---|---|---|---|
| 5,539,640 A * | 7/1996 | Kishimoto et al. | 701/40 |
| 5,719,565 A | 2/1998 | Tsuno et al. | |
| 5,900,542 A * | 5/1999 | Fricke et al. | 73/146 |
| 6,112,586 A * | 9/2000 | Fricke et al. | 73/146 |
| 7,168,308 B2 * | 1/2007 | Mancosu et al. | 73/146 |
| 7,203,579 B2 * | 4/2007 | Yokota et al. | 701/29.2 |
| 2005/0038589 A1 * | 2/2005 | Shukla | 701/80 |
| 2005/0085987 A1 | 4/2005 | Yokota et al. | |
| 2007/0050121 A1 * | 3/2007 | Ammon et al. | 701/80 |
| 2007/0124053 A1 * | 5/2007 | Lindskog et al. | 701/72 |
| 2008/0243327 A1 * | 10/2008 | Bujak et al. | 701/29 |
| 2008/0243334 A1 * | 10/2008 | Bujak et al. | 701/37 |

FOREIGN PATENT DOCUMENTS

| | | |
|---|---|---|
| EP | 0 556 070 A | 8/1993 |
| EP | 1 273 496 B1 | 1/2003 |
| EP | 1 457 388 A | 9/2004 |
| JP | 11 094661 A | 4/1999 |
| WO | WO 2005/095173 A1 | 10/2005 |

OTHER PUBLICATIONS

German Office Action German application No. 10 2005 057 342.1-52, 3 pages, Jan. 25, 2008.

* cited by examiner

METHOD FOR DETERMINING A ROADWAY STATE

CROSS-REFERENCE TO RELATED APPLICATIONS

This application is a United States national phase filing under 35 U.S.C. §371 of International Application No. PCT/EP2007/061778, filed Oct. 31, 2007 which claims priority to German Patent Application No. 10 2006 057 342.0, filed Dec. 5, 2006. The complete disclosure of the above-identified application is hereby fully incorporated herein by reference.

TECHNICAL FIELD

The invention relates to a method and a device for determining a roadway state.

BACKGROUND

In modern vehicle information systems, the driver of a motor vehicle can be given information about the current state of the roadway, in particular in the case of a wet roadway, a snow-covered or a frozen over roadway. In order to ensure that information about the roadway state is made available in a reliable manner, the evaluation of measurement signals of one sensor or more sensors is usually required. This data is evaluated in the case of anti-lock brake systems (ABS) or anti-slip traction control systems (ASR) in order to obtain reports about the state of the roadway. It is then possible by interventions in different components of the motor vehicle to exert an influence on the driving behavior of the motor vehicle.

DE 10 2004 016 288 B3 discloses a method for determining a friction value in the case of which the vibrations of a tire are detected and one characteristic of the tire vibration, in particular a frequency spectrum and/or a time domain spectrum is evaluated. To this end, the following steps are carried out: Data is evaluated by means of physical and/or phenomenological model approaches, evaluation signals are observed in at least two frequency bands, amplitudes of the evaluation signals are compared with friction value-dependent empirical values also dependent on a current force transfer condition of the tire, a friction value is derived and from the friction value a maximum available force that can be transferred from the tires to the roadway is determined.

The publication "Estimation of Tire-Road Friction by Tire Rotational Vibration Model" (Takaji Umeno, R&D Review of Toyota CCRDL, vol. 37 No. 3) discloses a method for the estimation of a friction value between the roadway and the tires for a free-rolling wheel in the case of which a frequency analysis of the angular speed of the wheel of the vehicle is used.

SUMMARY

According to various embodiments, a method and a device for determining a roadway state can be created which can be implemented in a simple and cost-effective manner.

According to an embodiment, in a method for determining a roadway state of a roadway on which a vehicle is traveling which has at least one wheel and an acceleration sensor that is assigned to the wheel in order to determine a vertical component of an acceleration of the wheel, a characteristic value, which is representative of the roadway state, is determined as a function of a measured signal of the acceleration sensor.

According to another embodiment, a device for determining a roadway state of a roadway on which a vehicle is traveling which has at least one wheel and an acceleration sensor that is assigned to the wheel in order to determine a vertical component of an acceleration of the wheel, may be embodied to
determine a characteristic value, which is representative of the roadway state as a function of a measured signal of the acceleration sensor.

According to further embodiments, the characteristic value for the roadway state may be determined as a function of the frequency spectrum of the measured signal of the acceleration sensor. According to further embodiments, the frequency spectrum may be determined by means of a Fourier transformation. According to further embodiments, at least two roadway states may be distinguished by means of the characteristic value. According to further embodiments, a first roadway state of the two distinguishable roadway states may be the roadway state of a roadway covered with asphalt and a second roadway state of the two distinguishable roadway states may be the roadway state of a roadway covered with snow/ice.

BRIEF DESCRIPTION OF THE DRAWINGS

Exemplary embodiments of the invention are described in more detail below with reference to the schematic figures of the drawing, in which.

Elements of the same design or function are characterized with the same reference symbols in all the figures.

DETAILED DESCRIPTION

In accordance with a first aspect, in a method for determining a roadway state of a roadway on which a vehicle which has at least one wheel and an acceleration sensor that is assigned to the wheel in order to determine a vertical component of an acceleration of the wheel is traveling, a characteristic value which is representative of the roadway state is determined as a function of a measured signal of the acceleration sensor.

For this reason, it is possible to use a sensor of a simple design such as an acceleration sensor in order to determine a vertical component of the wheel acceleration and to use this for determining the roadway state. Such a sensor can be provided in a very cost-effective manner.

In accordance with an embodiment, the characteristic value for the roadway state can be determined as a function of a frequency spectrum of the measured signal of the acceleration sensor. This makes it possible to use a simple method in order to evaluate the signal of the acceleration sensor.

In a further embodiment, the frequency spectrum is determined by means of a Fourier transformation. The Fourier transformation represents a particularly simple method of frequency analysis.

In accordance with a further embodiment, at least two roadway states can be distinguished by means of the characteristic value. This makes a rough classification of at least two roadway states possible.

In a further embodiment, a first roadway state of the two distinguishable roadway states of the roadway state is a roadway covered with asphalt and a second roadway state of the two distinguishable roadway states of the roadway state is a roadway covered with snow/ice. This makes possible a rough classification of the roadway states for at least a roadway covered with asphalt and a roadway covered with snow/ice. This also makes it possible to give a rough estimate of a friction value between the wheel and the roadway.

In accordance with a second aspect, a device for determining a roadway state of a roadway on which is traveling a vehicle which has at least one wheel and an acceleration sensor that is assigned to the wheel in order to determine a vertical component of an acceleration of the wheel, may be embodied to determine a characteristic value representative of the roadway state as a function of a measured signal of the acceleration sensor.

Figure 1:
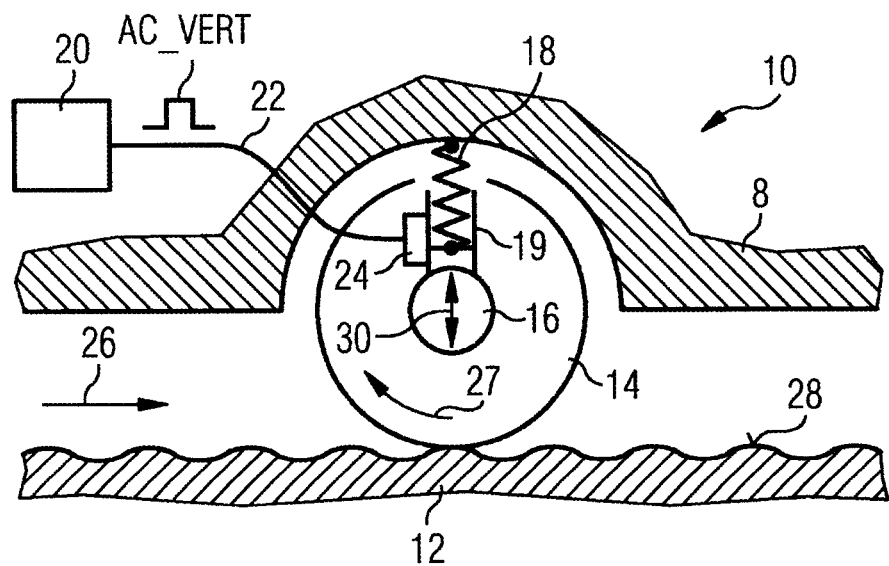
FIG. 1 shows a section through a vehicle with a wheel and a part of a roadway.

FIG. 1 shows a section through a vehicle 10, which has a car body 8 and at least one wheel 14. The wheel 14 is connected to the car body 8 by means of a wheel axle 16, a spring element 18, and a tube element 19. The spring element 18 is connected to the tube element 19 in a fixed manner. The tube element 19 is on the other hand again connected to the wheel axle 16 in a rigid manner. The spring element 18 and the tube element 19 together preferably form a shock absorber in view of the vehicle 10. An acceleration sensor 24 is arranged in the tube element 19, which is connected to an evaluation unit 20 in the vehicle 10 by means of a connecting line 22. The evaluation unit 20 is a preferred component of a control device of the vehicle.

As shown in FIG. 1, the wheel 14 is positioned on a roadway 12. The vehicle 10 and thereby also the wheel 14 preferably travel on the roadway 12 in a direction of travel 26. By means of the movement of the vehicle 10 in the direction of travel 26, the wheel rotates counterclockwise in a direction of rotation 27. Because the roadway 12 has a roadway surface structure 28, a translational movement of the wheel 14 vertical to the direction of travel 26 of the vehicle 10 is superimposed on the rotational movement of the wheel 14. Such a translational movement of the wheel 14 vertical to the direction of travel 26 of the vehicle 10, indicates a vertical movement of the wheel 14 referred to the vehicle 10 in a vertical traveling direction 30. This enables the acceleration sensor 24 to determine a vertical component of an acceleration of the wheel 14. By means of the evaluation unit 20, it is possible in this way to detect a measured signal AC_VERT of the vertical component of the acceleration of the wheel 14 recorded by means of the acceleration sensor 24.

In order to carry out the method for determining a roadway state STATE, a program can be stored in one of the program memories assigned to the control device of the vehicle 10 and processed during the operation of the vehicle 10. The roadway state can be determined by means of the program and, if required, further measures may be introduced in order to control the vehicle.

Figure 2:
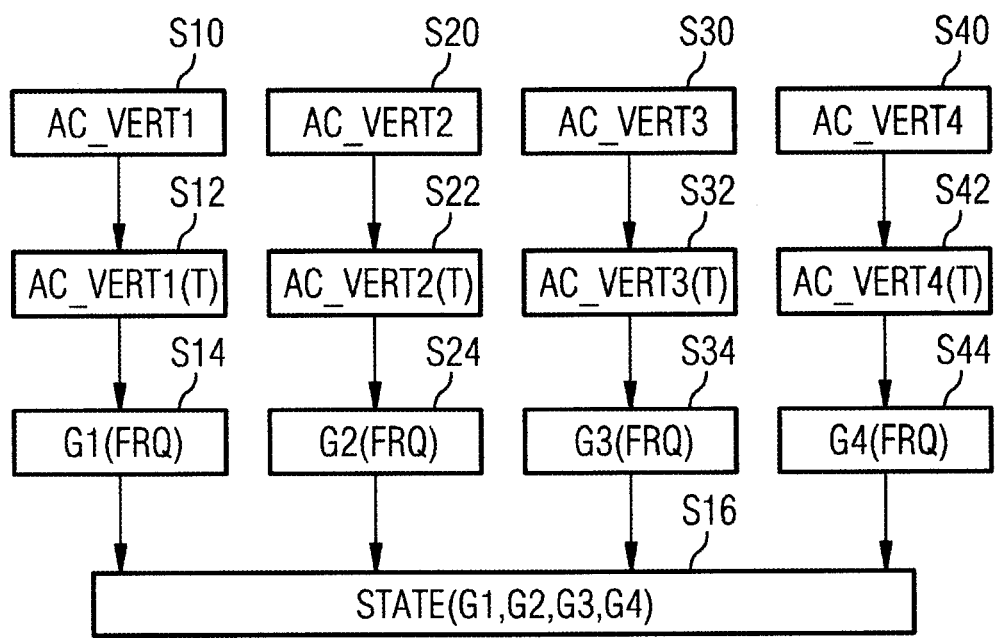
FIG. 2 shows a flow diagram of a program, which is processed in a control device.

In the method shown in FIG. 2, a detection of four measured signals AC_VERT1, AC_VERT2, AC_VERT3, AC_VERT4 of the acceleration sensors 24 is carried out for four wheels 14 of the vehicle 10. However, the method may also be carried out for any number of measured signals AC_VERT, similarly for only one of the wheels 14 or for two, three or more than four wheels 14 of the vehicle 10.

The four measured signals AC_VERT1, AC_VERT2, AC_VERT3, AC_VERT4 of the specific acceleration sensor 24 assigned to the wheel 14 are detected in a step S10, S20, S30, S40.

A graph AC_VERT1(T), AC_VERT2(T), AC_VERT3(T), AC_VERT4(T) of the acceleration sensors 24 which depends on the time T is recorded and stored in a step S12, S22, S32, S42.

In a step S14, S24, S34, S44, the graph of the measured signals AC_VERT1(T), AC_VERT2(T), AC_VERT3(T), AC_VERT4(T) of the acceleration sensors 24 which depends on the time T is subjected to a frequency analysis and a frequency spectrum G1(FRQ), G2(FRQ), G3(FRQ), G4(FRQ) is determined in each case. The determination of the frequency spectra G1(FRQ), G2(FRQ), G3(FRQ), G4(FRQ) through frequency analysis takes place each time by means of a Fourier transformation.

From the graphs of the frequency spectra G1(FRQ), G2(FRQ), G3(FRQ), G4(FRQ) a statement can be made about a roadway state STATE. Preferably the acceleration sensors 24 of all the wheels 14 are used in order to determine the roadway state STATE, but at least the acceleration sensor 24 of one of the wheels 14.

Figure 3:
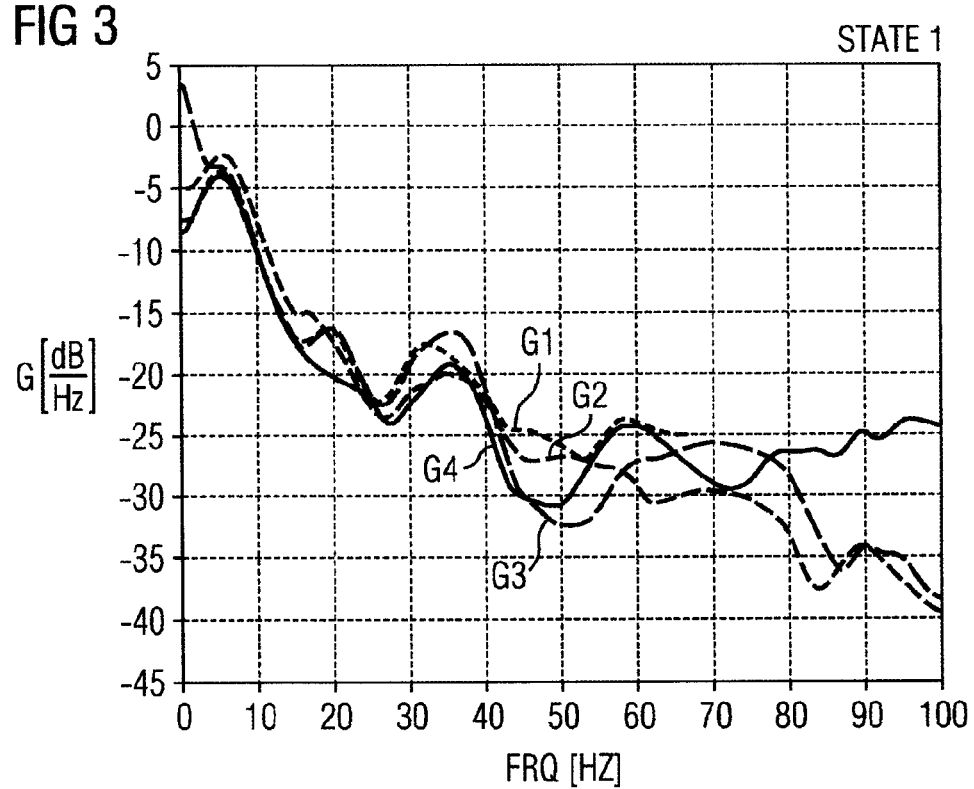
FIG. 3 shows a plot of a frequency spectrum as a function of the frequency for a roadway covered with asphalt.
Figure 4:
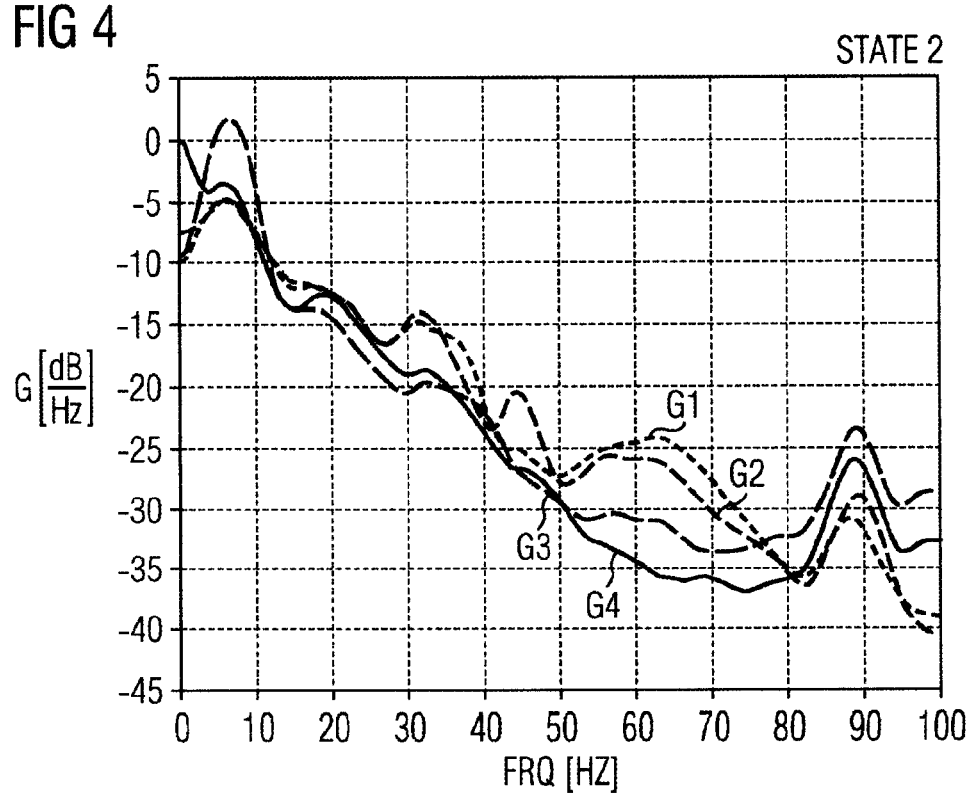
FIG. 4 shows a plot of a frequency spectrum as a function of the frequency for a roadway covered with snow/ice.

FIGS. 3 and 4 for example show the frequency spectra G1, G2, G3, G4 as a function of the frequency FRQ for a first roadway state STATE1 of the two distinguishable roadway states, the roadway state of a roadway covered with asphalt (FIG. 3), and for a second roadway state STATE2 of the two distinguishable roadway states, the roadway state of a roadway covered with snow/ice (FIG. 4). In the case of the method for determining a roadway state STATE, the frequencies FRQ below 20 hertz are disregarded because these concern wheel vibrations that are independent of the roadway state STATE.

FIG. 3 shows the frequency spectra G1, G2, G3, G4 for four wheels for the roadway state STATE1, this means for the roadway state of a roadway covered with asphalt. In the case of a roadway state STATE1 of a roadway covered with asphalt, a local maximum of the frequency spectra G1, G2, G3, G4 of the four wheels 14 occurs in a frequency range between 30 and 40 hertz. The plots for the four wheels 14 shown here indeed differ in detail and the occurrence of the local maxima of the frequency spectra in a frequency range between 30 and 40 hertz can, however, be recognized clearly.

FIG. 4 shows the frequency spectra G1, G2, G3, G4 for the four wheels 14 for the roadway state STATE2 of a roadway covered with snow/ice. For the roadway state STATE2 of a roadway covered with snow/ice, the local maximum of the frequency spectra G1, G2, G3, G4 between 30 and 40 hertz for all four wheels 14 is defined only faintly, whereas a clear local maximum occurs in the range of 90 hertz. In addition, in this case, the maxima of the frequency spectra G1, G2, G3, G4 are defined in degrees of clarity but can, however, be distinguished clearly for all four wheels 14.

As a result, in order to evaluate the frequency spectrum, the following can be determined:

If a local maximum of the frequency spectrum G can be observed in the frequency range FRQ of 90 hertz, while no or only a faint local maximum of the frequency spectrum G occurs in the frequency range FRQ between 30 and 40 hertz, then this characterizes the roadway state STATE2 of a roadway covered with snow/ice. If on the contrary, a local maximum of the frequency spectra G can be observed in the frequency range FRQ from 30 to 40 hertz, and if in the frequency range FRQ of 90 hertz there is no maximum or only a faintly defined local maximum of the frequency spectrum G is present, then this characterizes the roadway state STATE1 of a roadway covered with asphalt. It is therefore possible to receive by means of a simple evaluation of the measured signal of the acceleration sensor 24, a rough distinction of the roadway state STATE between a roadway covered with asphalt and a roadway covered with snow/ice.

The invention claimed is:

1. A method for determining a roadway state of a roadway on which a vehicle is traveling which has at least one acceleration sensor assigned to at least one wheel of the vehicle in order to determine a vertical component of an acceleration of the at least one wheel, the method comprising:
an evaluation unit receiving measured signals from the at least one acceleration sensor,
the evaluation unit automatically determining at least one frequency spectrum from the at least one acceleration sensor,
the evaluation unit automatically identifying at least one local maximum of the at least one frequency spectrum, and
the evaluation unit automatically identifying a roadway state of the roadway based on the at least one identified local maximum of the at least one frequency spectrum.

2. The method according to claim 1, wherein each frequency spectrum is determined using a Fourier transformation.

3. The method according to claim 1, comprising distinguishing between at least two roadway states based on the at least one identified local maximum of the at least one frequency spectrum.

4. The method according to claim 3, wherein a first roadway state of the two distinguishable roadway states being the roadway state of a roadway covered with asphalt and a second roadway state of the two distinguishable roadway states being the roadway state of a roadway covered with snow or ice.

5. A device for determining a roadway state of a roadway on which a vehicle is traveling which has at least one acceleration sensor assigned to at least one wheel of the vehicle in order to determine a vertical component of an acceleration of the at least one wheel, comprising:
an evaluation unit configured to:
receive measured signals from the at least one acceleration sensor,
determine at least one frequency spectrum from the at least one acceleration sensor,
identify at least one local maximum of the at least one frequency spectrum, and
identify a roadway state of the roadway based on the at least one identified local maximum of the at least one frequency spectrum.

6. The device according to claim 5, wherein the evaluation unit is further operable to determine each frequency spectrum using a Fourier transformation.

7. The device according to claim 5, wherein the evaluation unit is further operable to distinguish between at least two roadway states based on the at least one identified local maximum of the at least one frequency spectrum.

8. The device according to claim 7, wherein a first roadway state of the two distinguishable roadway states being the roadway state of a roadway covered with asphalt and a second roadway state of the two distinguishable roadway states being the roadway state of a roadway covered with snow or ice.

9. A vehicle comprising:
at least one wheel and at least one acceleration sensor that is assigned to at least one the wheel in order to determine a vertical component of an acceleration of the at least one wheel; and
an evaluation unit configured to:
receive measured signals from the at least one acceleration sensor,
determine at least one frequency spectrum from the at least one acceleration sensor,
identify at least one local maximum of the at least one frequency spectrum, and
determine a roadway state of a roadway on which a vehicle is traveling based on the at least one identified local maximum of the at least one frequency spectrum.

10. The vehicle according to claim 9, wherein the evaluation unit is further operable to determine the each frequency spectrum using a Fourier transformation.

11. The vehicle according to claim 9, wherein the evaluation unit is operable to distinguish between at least two roadway states based on the at least one identified local maximum of the at least one frequency spectrum.

12. The vehicle according to claim 11, wherein a first roadway state of the two distinguishable roadway states being the roadway state of a roadway covered with asphalt and a second roadway state of the two distinguishable roadway states being the roadway state of a roadway covered with snow or ice.

* * * * *